W. S. CARR.
Water-Closets.
No. 5,867. Reissued May 12, 1874
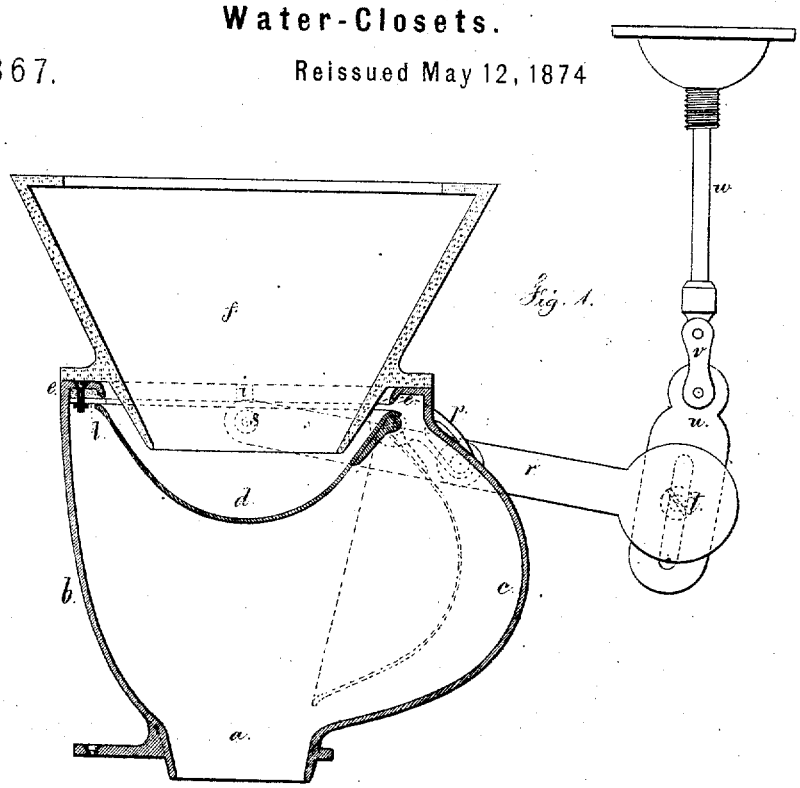
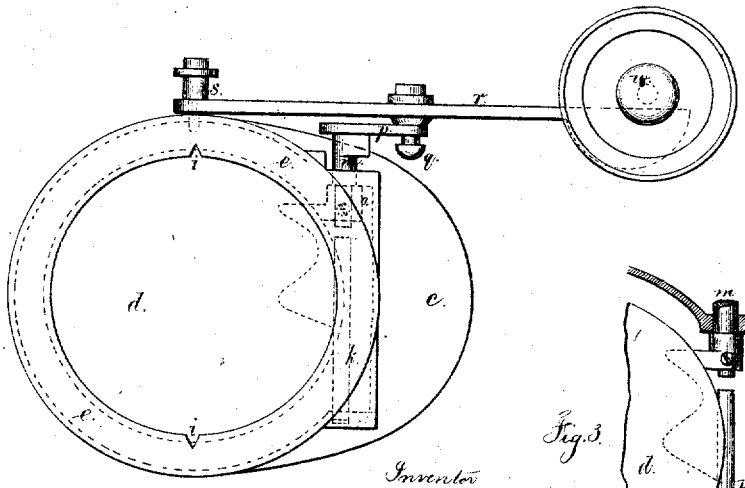
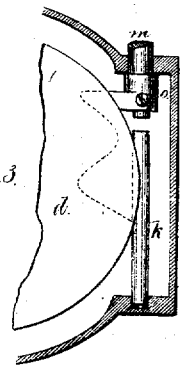
Inventor
Chas. H. Smith
Geo. D. Pinckney
William S. Carr
Lemuel W. Serrell
Atty
AM. PHOTO-LITHOGRAPHIC CO. N.Y. (OSBORNE'S PROCESS.)

UNITED STATES PATENT OFFICE.

WILLIAM S. CARR, OF NEW YORK, N. Y., ASSIGNOR TO CHARLES M. KELLER AND CHARLES F. BLAKE, TRUSTEES.

IMPROVEMENT IN WATER-CLOSETS.

Specification forming part of Letters Patent No. 80,708, dated August 4, 1868; reissue No. 5,867, dated May 12, 1874; application filed December 19, 1872.

DIVISION B.

*To all whom it may concern:*

Be it known that I, WILLIAM S. CARR, of the city, county, and State of New York, have invented Improvements in Water-Closets, of which the following is a specification:

In constructing the receivers or containers of pan water-closets, it has heretofore been customary to project this container out rearward and horizontally beyond the basin, and to extend the rear side or wall of the container outward and upward until it reaches as high as the top of the container. Space was thus included inside of the container in which the pan could lie when dumped or depressed, but the space was too large for the purpose, there being an angular recess above and behind the upper half of the pan when depressed.

I make a stronger and cheaper container by forming that part of it which lies behind the basin of a sort of spherical or bulging form, the contour being such that the bottom of the pan, when depressed, conforms with some, but not entire, exactness to the interior surface of this spherically-shaped part of the container, thus avoiding the ordinary waste space, making the container smaller and of less weight. This shape of the rear of the container moreover narrows it at the place where the pan-axle passes through it, and thus permits of the use of a shorter axle, and at the same time permits the pan-lever to be located at its pivoted end, close to the container, and still leave room for the pan-arm between the lever and the container. With containers of the ordinary shape the pan-lever must be set at some distance from the side of the container, and the whole apparatus takes up more room than when the container is shaped in the manner devised by me.

In the drawing, Figure 1 is a vertical section of a pan water-closet, with the container shaped according to the form invented by me. Fig. 2 is a plan or top view of the same with the basin removed; and Fig. 3 is a section, showing certain details of the pan-spindle.

In the drawing, the pan is shown at *d*, and the container at *a a b c*. The bulging part thereof is represented at *c*, conforming generally to the shape of the bottom of the pan. The pan-lever is represented at *r*, and the pan-arm at *p*, the latter moving and working in space that would be included within a container of the usual shape.

What I claim as my invention is—

A container for a pan water-closet, formed with a bulge or spherically-shaped recess, for the reception of the pan when depressed, substantially as set forth.

Dated November 26, 1872.

Witnesses: WM. S. CARR.

GEO. T. PINCKNEY,

CHAS. H. SMITH.